(12) United States Patent
Batarseh

(10) Patent No.: US 11,753,915 B2
(45) Date of Patent: Sep. 12, 2023

(54) LASER TOOL WITH COLOR APPLICATOR

(71) Applicant: Saudi Arabian Oil Company, Dhahran (SA)

(72) Inventor: Sameeh Issa Batarseh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 124 days.

(21) Appl. No.: 16/887,115

(22) Filed: May 29, 2020

(65) Prior Publication Data

US 2021/0372252 A1 Dec. 2, 2021

(51) Int. Cl.
*E21B 43/24* (2006.01)
*B23K 26/142* (2014.01)
(Continued)

(52) U.S. Cl.
CPC .......... *E21B 43/2405* (2013.01); *B23K 26/08* (2013.01); *B23K 26/142* (2015.10);
(Continued)

(58) Field of Classification Search
CPC ........ E21B 17/1078; E21B 43/11; E21B 7/14; E21B 7/15; E21B 17/10; E21B 43/2405; E21B 47/1015; E21B 29/06; E21B 7/00; E21B 43/00; E21B 43/26; E21B 43/24; H01L 45/06; H01L 45/124;
(Continued)

(56) References Cited

U.S. PATENT DOCUMENTS 6,755,262 B2 6/2004 Parker
6,888,097 B2 5/2005 Batarseh
(Continued)

FOREIGN PATENT DOCUMENTS

CN 203081295 U 7/2013
CN 203334954 U 12/2013
(Continued)

OTHER PUBLICATIONS

"Carbon." Chemicool Periodic Table. Chemicool.com. Jul. 25, 2014. Web. Nov. 17, 2021 <https://www.chemicool.com/elements/carbon.html>. (Year: 2014).*
(Continued)

*Primary Examiner* — William J Levicky
*Assistant Examiner* — Adam M Eckardt
(74) *Attorney, Agent, or Firm* — Osha Bergman Watanabe & Burton LLP

(57) ABSTRACT

An example laser tool is configured to operate within a wellbore of a hydrocarbon-bearing rock formation. The laser tool includes one or more optical transmission media. The one or more optical transmission media are part of an optical path originating at a laser generator configured to generate a laser beam having an axis. The one or more optical transmission media are for passing the laser beam. The laser tool includes an optical element that is part of the optical path. The optical element is for receiving the laser beam from the one or more optical transmission media and for output to the hydrocarbon-bearing rock formation. The laser tool includes a color applicator head for discharging one or more coloring agents to a surface in the wellbore in a path of the laser beam.

16 Claims, 8 Drawing Sheets

(51) Int. Cl.
  *B23K 26/144* (2014.01)
  *B23K 26/146* (2014.01)
  *B23K 26/14* (2014.01)
  *B23K 26/08* (2014.01)
  *E21B 7/15* (2006.01)

(52) U.S. Cl.
  CPC .......... *B23K 26/144* (2015.10); *B23K 26/146* (2015.10); *B23K 26/1462* (2015.10); *E21B 7/15* (2013.01)

(58) Field of Classification Search
  CPC ............... H01L 45/1273; H01L 45/144; H01L 45/1691; H01L 21/31; H01L 21/469; Y02E 60/13; G01P 3/38; G06K 9/00; G06Q 50/00; G06Q 50/10; G06Q 50/22; G06T 7/00; H01G 11/24; H01G 11/30; B23K 26/142; B23K 26/144; B23K 26/146; B23K 26/1462; B23K 26/08; B23K 26/18; B23K 26/382
  See application file for complete search history.

(56) References Cited

U.S. PATENT DOCUMENTS

| | | | |
|---|---|---|---|
| 9,168,612 | B2 | 10/2015 | Wilkiel et al. |
| 2014/0360778 | A1 | 12/2014 | Batarseh |
| 2017/0022804 | A1* | 1/2017 | Gupta .................... E21B 47/11 |
| 2019/0055789 | A1* | 2/2019 | Azar ....................... E21B 10/43 |
| 2019/0353032 | A1* | 11/2019 | Batarseh ................. E21B 7/15 |

FOREIGN PATENT DOCUMENTS

| | | |
|---|---|---|
| WO | WO-2016/090229 A1 | 6/2016 |
| WO | WO-2019/220198 A1 | 11/2019 |
| WO | WO-2021/240227 A1 | 12/2021 |

OTHER PUBLICATIONS

Batarseh, S. et al., Laser Perforation: Lab to the Field, Society of Petroleum Engineers—SPE Abu Dhabi International Petroleum Exhibition and Conference (Nov. 2017), Paper No. SPE-188729-MS.

Batarseh, S. et al., Laser Perforation: The Smart Completion, Society of Petroleum Engineers—SPE Abu Dhabi International Petroleum Exhibition and Conference (Nov. 2019), Paper No. SPE-197192-MS.

International Search Report for PCT/IB2020/057395, 5 pages (dated Feb. 8, 2021).

Written Opinion for PCT/IB2020/057395, 9 pages (dated Feb. 8, 2021).

* cited by examiner

LASER TOOL WITH COLOR APPLICATOR

TECHNICAL FIELD

This specification describes examples of laser tools that are usable in a wellbore to create fluid flow paths through hydrocarbon-bearing rock formations.

BACKGROUND

Wellbore stimulation is a branch of petroleum engineering focused on ways to enhance the flow of hydrocarbons from a rock formation into a wellbore. The flow of hydrocarbons from a rock formation into a wellbore is based, at least in part, on a permeability of the rock formation. When the permeability of the rock formation is small, stimulation may be applied to enhance the flow of hydrocarbons from the rock formation. In some cases, stimulation may be performed in stages. For example, a first stage of the stimulation may include perforating walls of the wellbore to create tunnels through the walls and through the rock formation. A second stage of the stimulation may include pumping fluids into the tunnels. The fluids fracture rock in the rock formation, thereby creating a fluid flow path into the wellbore. Hydrocarbons, such as oil, may flow along the fluid flow path and into the wellbore.

SUMMARY

An example laser tool is configured to operate within a wellbore of a hydrocarbon-bearing rock formation. The laser tool includes one or more optical transmission media. The one or more optical transmission media are part of an optical path originating at a laser generator configured to generate a laser beam having an axis. The one or more optical transmission media are for passing the laser beam. The laser tool includes an optical element that is part of the optical path. The optical element is for receiving the laser beam from the one or more optical transmission media and for output to the hydrocarbon-bearing rock formation. The laser tool includes a color applicator head for discharging one or more coloring agents to a surface in the wellbore in a path of the laser beam.

The one or more coloring agents may include a powder, a liquid, a gas or an aerosol. The one or more coloring agents may include a black liquid agent.

The color applicator head may include one or more color applicator nozzles. Each color applicator nozzle may be in fluid communication with a fluid conduit and a reservoir. The one or more color applicator nozzles may be positioned on or near a laser muzzle of the color applicator head and may be configured to discharge the one or more coloring agents at a pressure that is sufficient to displace wellbore fluids surrounding the laser muzzle.

The color applicator head may be extendable along the axis of the laser beam. The extendable color applicator head may be configured to enter a hole in the rock formation formed by the laser beam. The color applicator head may include a lens configured to defocus the laser beam. The color applicator head may include a lens mounted on a movable stage such that the lens rotates or deflects the laser beam. The color applicator head may include one or more purging nozzles for removing dust or vapor from a path of the laser beam.

An example method is performed within a wellbore of a hydrocarbon-bearing rock formation. The method includes passing, through one or more optical transmission media, a laser beam having an axis and generated by a laser generator at an origin of an optical path, the optical path comprising the one or more optical transmission media. The method includes applying one or more coloring agents to a surface in the wellbore in a path of the laser beam using a color applicator head discharging the one or more coloring agents.

The one or more coloring agents may include a powder, a liquid, a gas or an aerosol. The one or more coloring agents may include a black liquid agent.

The method may include alternating discharging the laser beam and applying the one or more coloring agents to the surface.

The color applicator head may be extendable along the axis of the laser beam. The method may include extending the extendable color applicator head along an axis of the laser beam. The method may include alternating discharging the laser beam and applying the one or more coloring agents to the surface and extending the color applicator head along an axis of the laser beam after each discharging of the laser beam. The method may include alternating discharging the laser beam and applying the one or more coloring agents to the surface, and extending the color applicator head along an axis of the laser beam during each discharging of the laser beam.

The method may include defocusing the laser beam. The method may include moving a lens of the color applicator head to rotate or deflect the laser beam. The method may include purging dust or vapor from a path of the laser beam.

Any two or more of the features described in this specification, including in this summary section, may be combined to form implementations not specifically described in this specification.

At least part of the processes and systems described in this specification may be controlled by executing, on one or more processing devices, instructions that are stored on one or more non-transitory machine-readable storage media. Examples of non-transitory machine-readable storage media include, but are not limited to, read-only memory, an optical disk drive, memory disk drive, random access memory, and the like. At least part of the processes and systems described in this specification may be controlled using a computing system comprised of one or more processing devices and memory storing instructions that are executable by the one or more processing devices to perform various control operations.

The details of one or more implementations are set forth in the accompanying drawings and the description. Other features and advantages will be apparent from the description and drawings, and from the claims.

DESCRIPTION OF THE DRAWINGS

Like reference numerals in the figures indicate like elements.

DETAILED DESCRIPTION

Figure 1:
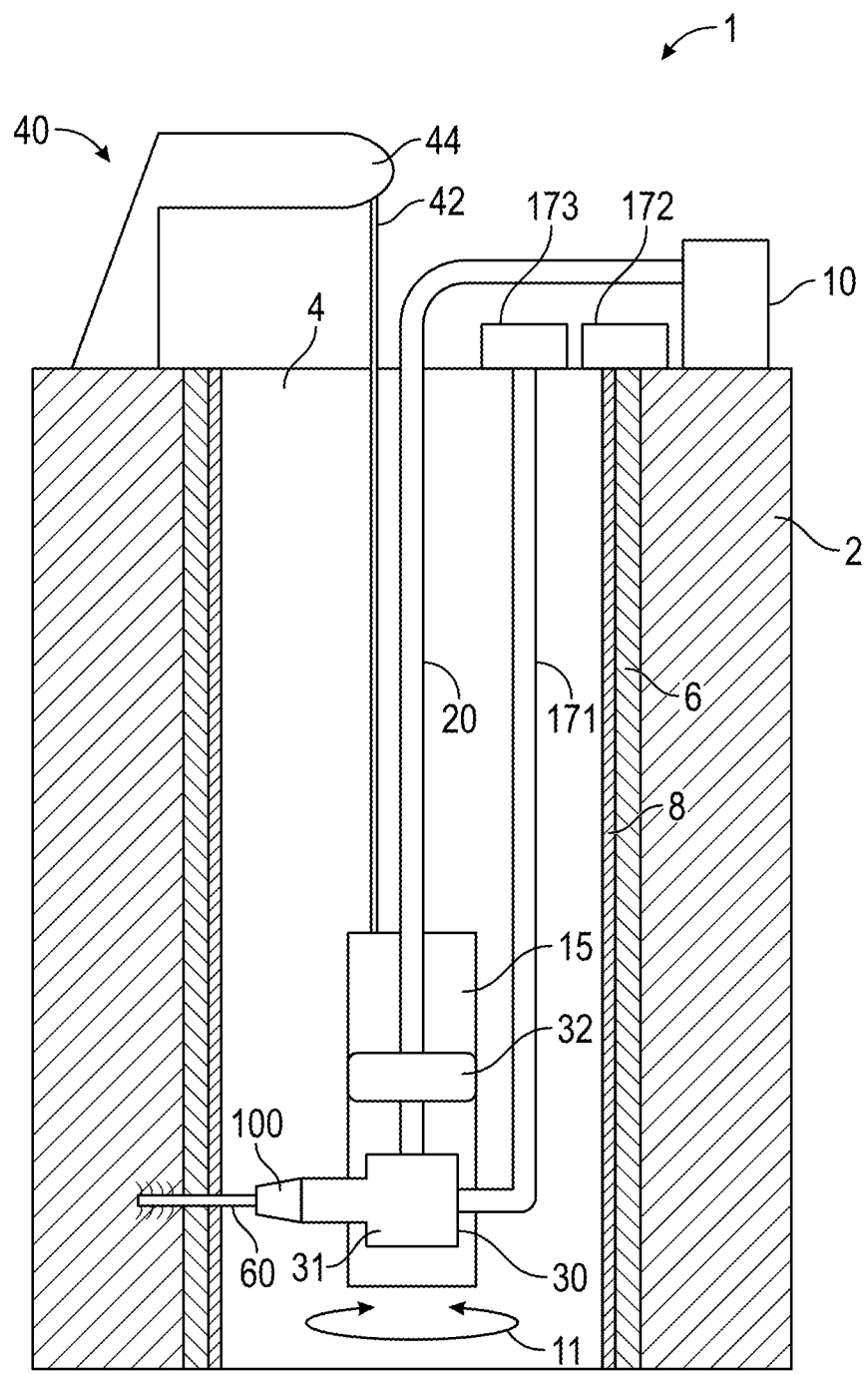
FIG. 1 is a cross-sectional schematic view of an example system for creating fluid flow paths through hydrocarbon-bearing rock formations.

This specification describes examples of laser tools for creating fluid flow paths through hydrocarbon-bearing rock formations. An example laser tool is introduced into a wellbore that extends through a hydrocarbon-bearing rock formation. The laser tool may operate downhole to create a fluid flow path through a wellbore casing and the rock formation. The fluid flow path is created by controlling the laser tool to direct a laser beam to rock in the rock formation. In one example, the laser beam has an energy density that is great enough to cause at least some of the rock in the rock formation to sublimate. Sublimation includes changing from a solid phase directly into a gaseous phase without first changing into a liquid phase. In the case of rock, sublimation occurs when the temperature of the rock, which is increased by the laser beam, exceeds a threshold. That threshold is known as the sublimation point and may be different for different types of rock. In this example, the sublimation of the rock creates tunnels or cracks through the rock formation. Fluids may be introduced into those tunnels or cracks to fracture the rock formation and thereby promote the flow of production fluid, such as oil, from the rock formation into the wellbore. In another example, the laser beam has an energy density that is great enough to cause fluid dispersed in the rock (for example, in layers including clay) to evaporate or to cause reduction in viscosity of such dispersed fluids, causing loss of fluid from the rock formation. Evaporation or other loss of fluid in a region of the rock formation may cause rock in the region to disintegrate or collapse, leading to holes or cavities in the rock.

An implementation of the laser tool described in the preceding paragraph includes a focusing system that holds an optical element. An example of an optical element is a (unitary) optical structure configured—for example, structured, arranged, or both—to manipulate a laser beam. Manipulation includes altering one or more properties of the laser beam. Examples of optical elements include a crystal and a lens.

The optical element is configured to receive, via an optical path, a raw laser beam output from a laser generator. The optical path may include one or more optical transmission media, such as fiber optic cables, that are strung downhole. The received laser beam is "raw" in the sense that the laser beam has not been acted-upon by the optical element. The optical element manipulates the raw laser beam by altering a geometry of the raw laser beam, a direction of the raw laser beam, or both the geometry and the direction of the raw laser beam. The laser beam output by the optical element is directed to the rock formation where, as described previously, the laser beam may heat rock to cause tunnels or cracks to form in the rock formation. The laser tool may be configured to rotate, which also affects the direction of the laser beam.

The example laser tool may also include one or more color applicators that may apply one or more coloring agents to a surface in a wellbore. Applying a coloring agent to a surface of a wellbore may alter the optical properties of the surface. A surface with a dark color (for example, black) may absorb laser light to a greater extent than a surface with a light color (for example, yellow or white). Increasing the absorbance of laser light may increase efficiency of laser operations (for example, laser drilling) as a greater percentage of laser energy transmitted by a laser tool is converted into heat within a rock formation.

The example laser tool may also include one or more sensors to monitor environmental conditions in the wellbore and to output signals indicative of the environmental conditions. Examples of the sensors may include temperature sensors to measure temperature downhole, pressure sensors to measure pressure downhole, and acoustic sensors to measure noise levels downhole. Other sensors may also be used as described in this specification. Signals received from the sensors may indicate that there are problems inside the wellbore or that there are problems with the laser tool. A drilling engineer may take corrective action based on these signals. For example, if a temperature or pressure downhole is such that drilling equipment, such as the laser tool, may be damaged, that equipment may be withdrawn from the wellbore.

FIG. 1 shows components of a system 1 that includes an implementation of a laser tool 30 of the type described in the preceding paragraphs. At least part of system 1 is disposed within wellbore 4. Wellbore 4 passes through a hydrocarbon-bearing rock formation 2 ("rock formation 2"). Rock formation 2 may include various materials, such as limestone, shale, or sandstone. Each of these materials has a different sublimation point. The sublimation point may be affected by properties of the material, such as the density of the material and the porosity of the material. A casing 8 is cemented 6 in place to reinforce the wellbore against rock formation 2. A string 15 that houses the laser tool 30 is run downhole through casing 8.

Laser tool 30 is configured to output a laser beam 60. In this example, the laser tool is also configured to rotate about an axis in the wellbore, such as a central axis of the wellbore. In some implementations, the laser tool 30 is mounted on an axle (not shown) for rotation. A motor 32 may be included in string 15 to implement the rotation of laser tool 30 about the axle. In some implementations, the entire string 15 is connected to a drive arrangement 46 that is configured to rotate string 15 and thus laser tool 30. Rotation of the laser tool is identified by circular arrow 11. During rotation, laser beam 60 may sweep the entire circumference of the wellbore. That is, the laser tool may rotate a full 360°. In some cases, the laser tool may rotate less than 360°.

Laser tool 30 is configured to direct laser beam 60 parallel to a surface containing the wellhead or at an angle that is not parallel to the surface. Laser tool 30 includes an optical element that is configured to affect the output of the laser beam. For example, an optical element may direct, collimate, focus, defocus, or otherwise manipulate the direction or geometry of the laser beam 60 prior to output. Laser tool 30 may include color applicator head 100 connected to laser tool body 31. Color applicator head 100 may be configured to apply one or more coloring agents to a surface in a wellbore prior to or during output of laser beam 60. In some implementations, color applicator head 100 may be configured to reduce or to eliminate dust and vapor in the path of a laser beam 60. Dust or vapor in the path of laser the laser beam may disrupt, bend, or scatter the laser beam.

A system 1 includes a laser generating unit, such as laser generator 10. Laser generator 10 is configured to generate a laser beam and to output the laser beam to the laser tool. In some implementations, laser generator 10 is at the surface near to the wellhead. In some implementations, laser generator 10 is downhole, in whole or in part. The laser beam output by laser generator 10 is referred to as a raw laser beam because it has not been manipulated by laser tool 30. Examples of laser generator 10 include ytterbium lasers, erbium lasers, neodymium lasers, dysprosium lasers, praseodymium lasers, and thulium lasers. In an example implementation, laser generator 10 is a 5.34 kilowatt (kW) ytterbium-doped, multi-clad fiber laser.

In some implementations, laser generator 10 can be configured to output laser beams having different energy densities. Laser beams having different energy densities may be useful for rock formations that are composed of different materials having different sublimation points. For example, laser beams having different energy densities may be used to sublimate different types of rocks in a rock formation or to liquefy or evaporate fluids dispersed in a rock formation. In some implementations, the operation of laser generator 10 is programmable. For example, laser generator 10 may be programmed to vary the optical properties of the laser beam or the energy density of the laser beam.

In some implementations, the laser beam output by laser generator 10 has an energy density that is sufficient to heat at least some rock to its sublimation point. In this regard, the energy density of a laser beam is a function of the average power output of the laser generator during laser beam output. In some implementations, the average power output of laser generator 10 is in one or more of the following ranges: between 500 Watts (W) and 1000 W, between 1000 W and 1500 W, between 1500 W and 2000 W, between 2000 W and 2500 W, between 2500 W and 3000 W, between 3000 W and 3500 W, between 3500 W and 4000 W, between 4000 W and 4500 W, between 4500 W and 5000 W, between 5000 W and 5500 W, between 5500 W and 6000 W, between 6000 W and 6500 W, or between 6500 W and 7000 W.

Laser generator 10 is part of an optical path that includes laser tool 30 and one or more optical transmission media. This optical path extends to the optical element in the laser tool. An example of an optical transmission medium that may be used is fiber optic cable 20. Fiber optic cable 20 may include a single fiber optic strand, multiple fiber optic strands, or multiple fiber optic cables that are run downhole from laser generator 10. Fiber optic cable 20 conducts the raw laser beam output by laser generator 10 to the laser tool 30. As described, the laser tool may manipulate the laser beam to change the geometry of the laser beam, the direction of the laser beam, or both. A laser beam 60 output from the laser tool may penetrate downhole casings and cement to reach the rock formation. In the example of FIG. 1, this means that the laser beam exits string 15 and penetrates casing 8 and cement 6 in order to reach the rock formation 2. The system may be configured to minimize, or to reduce, power loss along the optical path. In some implementations, each laser beam 60 has a power density or energy density (at the laser beam's target) that is 70% or more of the power density or energy density of the laser beam output by laser generator 10.

The duration that the laser beam is applied to the rock in the formation may affect the extent to which the laser beam sublimates, and therefore penetrates, the rock. For example, the more time that the laser beam is applied to a particular location, the greater the penetration of the rock at that location may be.

In some implementations, laser generator 10 is configured to operate in a run mode until a target penetration depth is reached. A run mode may include a cycling mode, a continuous mode, or both. During the continuous mode, laser generator 10 generates a laser beam continuously, for example, without interruption. In the continuous mode, laser generator 10 produces the laser beam until a target penetration depth is reached. During the cycling mode, laser generator 10 is cycled between being on and being off. In some implementations, laser generator 10 generates a laser beam during the on period. In some implementations, laser generator 10 does not generate a laser beam during the off period. In some implementations, laser generator 10 generates a laser beam during the off period, but the laser beam is interrupted before reaching laser tool 30 downhole. For example, the laser beam may be safely diverted or the laser beam may be blocked from output. Laser generator 10 may operate in the cycling mode to reduce the chances of one or more components of the system overheating, to clear a path of the laser beam, or both.

In the cycling mode, a duration of an on period can be the same as a duration of an off period. In the cycling mode, the duration of the on period can be greater than the duration of the off period, or the duration of the on period can be less than the duration of the off period. The duration of each on period and of each off period may be based on a target penetration depth. Other factors that may contribute to the duration of on periods and the duration of off periods include, for example, rock type, purging methods, laser beam diameter, and laser power.

The duration of each on period and of each off period may be determined by experimentation. Experiments on a sample of rock from a formation may be conducted prior to, or after, lowering the laser tool into the wellbore. Such experiments may be conducted to determine, for a cycling mode, optimal or improved durations of each on period and of each off period. Alternatively or additionally, the duration of each on period and of each off period may be determined by geological methods. For example, seismic data or subsurface maps of rock formation 2 may be analyzed and the duration may be based on the result of the analysis or analyses.

In some implementations, on periods and off periods can last between one and five seconds. In an example operation, the on period lasts for 4 seconds and the off period lasts for 4 seconds. Such operation may enable the laser beam to penetrate a rock formation comprised of Berea Sandstone to a depth of 30 centimeters (cm).

In this regard, the selection of a run mode may be based on a type of rock to penetrate and a target penetration depth. A rock formation that may require the laser generator to operate in the cycling mode includes, for example, sandstones having a large quartz content, such as Berea Sandstone. A rock formation that may require the laser generator to operate in the continuous mode includes, for example, limestone.

Target penetration depth may be determined based on a variety of factors, such as a type of material or rock in the formation, a maximum horizontal stress of material or rock in the formation, a compressive strength of material or rock in the formation, a desired penetration depth, or a combination of two or more of these features. In some examples, penetration depth is measured from the interior wall of the wellbore. Examples of penetration depths may be on the order of millimeters, centimeters, or meters. Examples of penetration depths may include penetration depths between 1 millimeter (mm) and 10 mm, penetration depths between 1 centimeter (cm) and 100 cm, and penetration depths between 1 meter (m) and 200 m.

System 1 may include a motion system 40. The motion system can include, for example, a hydraulic system, an electrical system, or a motor operated system to move the laser tool to a target location. In this regard, the motion system is configured to move the laser tool to different locations, such as depths, within the wellbore 4. To this end, the motion system includes at least one component that is movable within the wellbore. For example, the motion system may include cable 42 that is configured to move uphole or downhole to enable the laser tool reach a target elevation. In an example, cable 42 may be at least partially spooled on a reel. A motor 44 may be connected to the reel. Motor 44 is configured to drive the reel to wind or to unwind cable 42. This causes cable 42 to move uphole or downhole within the wellbore.

Cable 42 is connected physically to string 15 such that movement of cable 42 translates to corresponding movement of string 15. As noted, string 15 houses laser tool 30. Thus, when string 15 moves, laser tool 30 also moves. Accordingly, the length of cable 42 within the wellbore may be controlled to position the laser tool.

In some implementations, the motion system uses components other than cable 42 to move the laser tool. For example, the motion system may use a coiled tubing string to connect to string 15. The coiled tubing string may be moved uphole or downhole in the same manner as cable 42 is moved uphole or downhole.

In some implementations, the motion system can include a rotational drive system to implement rotation of string 15, and thus rotation of laser tool 30, about an axis in the wellbore. In an example implementation, the rotational drive system includes a motor and a drive train, such as an axle or rack and pinion arrangement (not shown), connected to cable 42 to implement the rotation of string 15.

A computing system may be configured—for example, programmed—to control positioning and operation of the laser tool. Examples of computing systems that may be used are described in this specification. Alternatively, or in addition, the laser generator may be configured to control positioning and operation of the laser tool. For example, the laser generator may include circuitry or may include an on-board computing system to implement control over the positioning and operation of the laser tool. In either case, signals may be exchanged with the motion system and the laser tool via wired or wireless connections. In some implementations, signals may be exchanged with the motion system or laser tool via fiber optic media.

During operation, laser tool 30 may relay its angular position to a control system, such as the computing system or the laser generator. In response, the control system may to operate the tool to form tunnels or cracks in the rock formation.

Materials used to implement the downhole components of system 1 may be resistant to the temperatures, pressures, and vibrations that may be experienced within wellbore 4. The materials may protect the system from fluids, dust, and debris. In some implementations, the materials include one or more of iron, nickel, chrome, manganese, molybdenum, niobium, cobalt, copper, titanium, silicon, carbon, sulfur, phosphorus, boron, tungsten, steel, steel alloys, stainless steel, or tungsten carbide.

A laser tool 30 may include a focusing system (not shown) to focus the laser beam. The focusing system includes an optical element. The optical element is configured to receive a raw laser beam from the optical transmission path and to manipulate the raw laser beam to produce a laser beam output, such as laser beam 60. As described, manipulating the laser beam may include altering a direction of the laser beam or changing a geometry of the laser beam. The geometry of the laser beam may include the cross-sectional shape of the laser beam. For example, the cross-sectional shape of the laser beam may change from circular to oval or from oval to rectangular. The geometry of the laser beam may include the size of the laser beam. For example, during focusing, the laser beam may decrease in cross-sectional diameter and volume, but maintain its overall shape. During defocusing—or scattering—the laser beam may increase in cross-sectional diameter and in volume.

An optical element may include a crystal, a lens, a mirror, a prism, a cube, a cylinder, or a cone. In some examples, an optical element is or includes a cylinder. One or both bases of the cylinder can be flat, angled, conical, concave, or convex. In some examples, an optical element is made of glass, plastic, quartz, crystal, or any other material capable of directing, focusing, or otherwise affecting a geometry or other property of a laser beam. In some examples, an optical element may be a single optical structure comprised of two or more components, such as a crystal, a lens, a mirror, a prism, a cube, a cylinder, or a cone.

The laser focusing system of a laser tool 30 may be optically connected to color applicator head 100. The laser beam passes through the focusing system and exits the focusing system through color applicator head 100.

An example color applicator head 100 may be configured to or capable of covering, at least in part, a surface in a wellbore with one or more coloring agents prior to or during output of laser beam 60. An example coloring agent, when applied to a surface in a wellbore, may be used to increase laser energy applied to the surface compared to a surface without color treatment.

Figure 2:
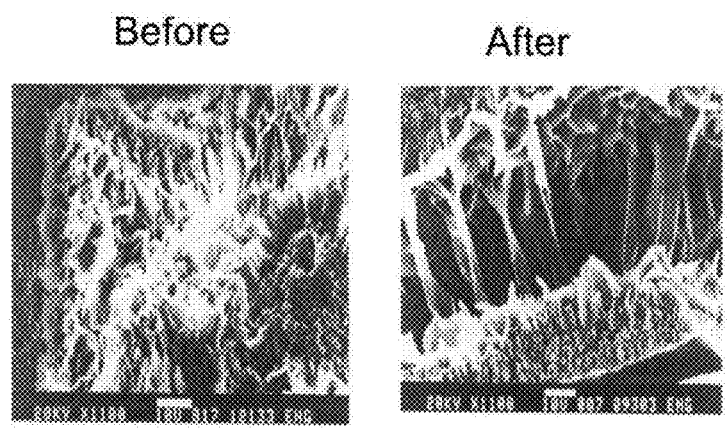
FIG. 2 shows Scanning Electron Microscopy images of clay before (left) and after (right) heating the clay to 550 degrees Celsius.

In downhole stimulation, such as heating or penetrating a material in a wellbore, including (steel) casing, tubing, cement, and rock formation, efficiency or efficacy of a laser technology may depend on an amount of laser energy that is absorbed by the material. In some implementations, the absorbed energy is sufficient to cause physical and chemical alterations of the material, for example, melting, liquefying, of evaporation of the material. In some example implementations, heating of material, may cause "collapse" of an area being heated. For example, heating an area in a wellbore including clay mixed with Illite or Smectite to approximately 550 degrees Celsius may cause collapse of the treated area, for example, as shown in FIG. 2. Wellbore fluids, for example, oil, may enter the collapsed area, which may increase the flow of fluids into the wellbore, thereby increasing production. In some implementation, the absorbed energy may be sufficient to cause sublimation of the material in the wellbore.

In some implementations, a laser generator 10 may be located at the surface near to the wellhead. A laser beam may be transmitted to laser tool 30 using an optical transmission medium, for example, fiber optic cable 20. In some implementation, transmitting the laser beam through an optical transmission medium may cause loss of an amount of laser energy. In some example implementations, the losses may reach 60% of energy generated by generator 10. For example, if the laser energy emitted by laser generator 10 is 10 kilowatts, the laser energy emitted by tool 30, for example, at a depth of 1700 meters may be only 4 kilowatts. A fraction of the energy output of an example laser tool directed to the material may be absorbed by the material. Another fraction of the energy output may be reflected, depending on, for example, the optical properties of the material, for example, the color of the material. Altering the optical properties of the material, for example, changing the color of the material, may reduce reflection of laser light and may enhance absorption.

Figure 3:
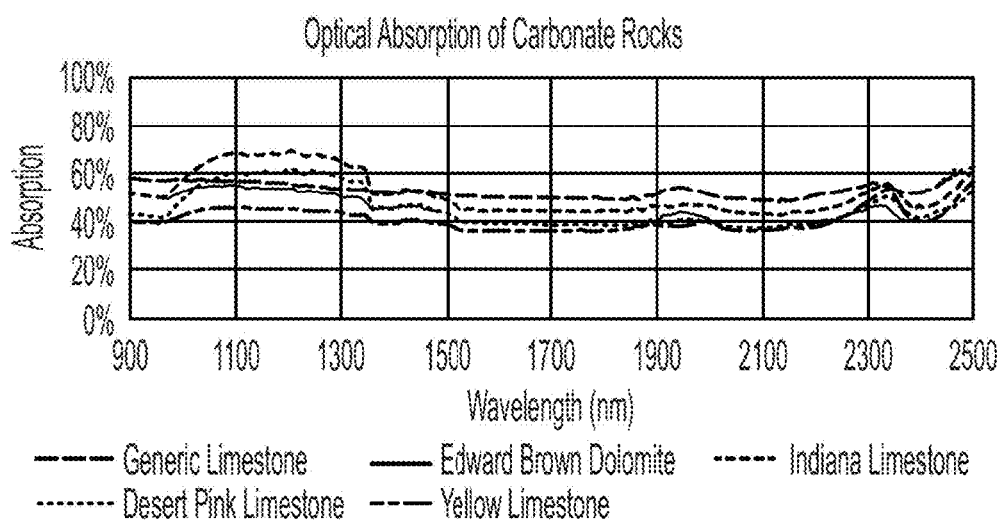
FIG. 3 is a graph illustrating absorption of light energy as a function of wavelength in different types of limestone.
Figure 4:
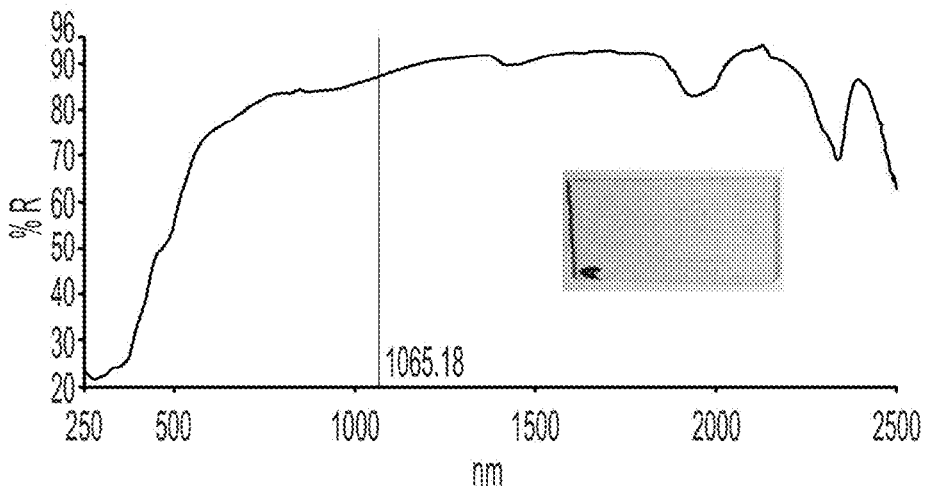
FIG. 4 is a graph illustrating reflectivity as a function of wavelength in Berea Sandstone.
Figure 5:
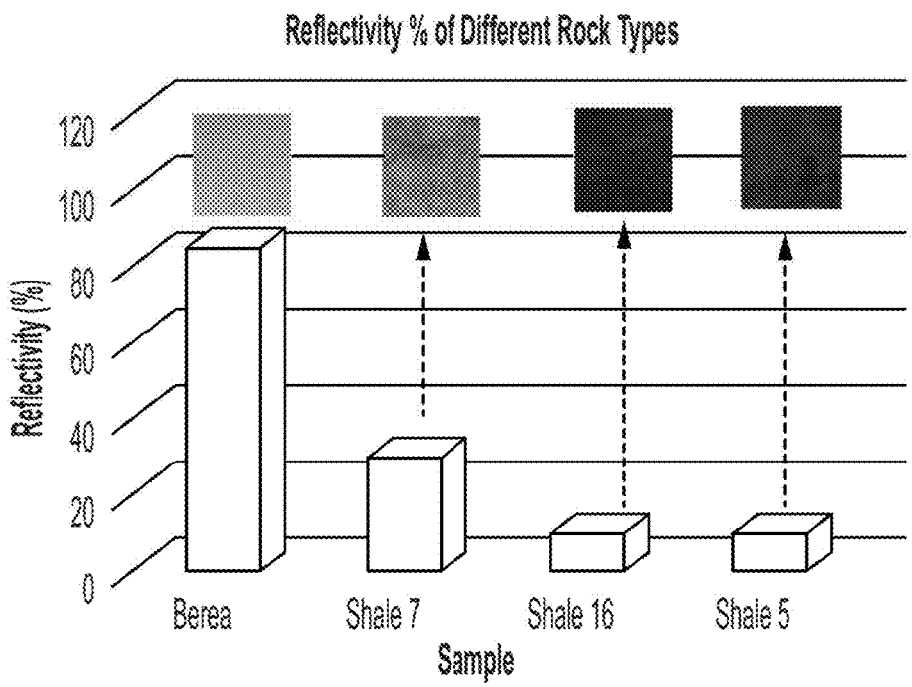
FIG. 5 is a graph illustrating reflectivity in different types of rock sample.

Materials in a wellbore, for example, rock formations of different chemical or physical compositions, may exhibit different optical properties, for example, different colors. Rock formations may contain a variety of minerals, metals, or other substances that may have different colors varying from bright to dark. In some instances, within the same types of rock or mineral, the degree of color variation may depend on the amount of energy transmitted to the rock. In some instances, levels of absorption or reflection of light energy may depend on the wavelength of light applied. The absorption of energy as a function of wavelength in different types of limestone is shown in FIG. 3. In this example, the amount of absorbed energy varied from 45% to 65% between different limestone samples exposed to laser light at a 1100 nanometer (nm) wavelength. In another example, Berea Sandstone, which may be considered a type of rock exhibiting a light yellowish color, showed a reflectivity of 85% when exposed to a laser beam at a wavelength 1065 nm using an ytterbium fiber laser with a power output of 2 kilowatts, as shown in FIG. 4. Comparison of different minerals with greater color variation may exhibit a greater range of absorption or reflectivity, for example, as shown in FIG. 5. When exposed to laser light of a wavelength of 1064 nm, Berea Sandstone exhibited reflection of 80% of energy. Shale materials, which have a darker color, reflected less energy, for example, about 7% in case of shale sample 5. Different shale samples had similar compositions but exhibited different colors and exhibited different levels of reflectivity.

Figure 6:
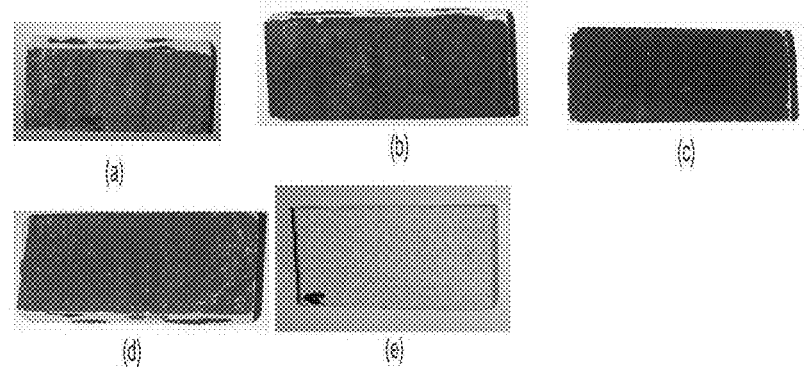
FIG. 6 is a set of photographs illustrating Berea Sandstone samples painted in colors (a) blue, (b) purple, (c) black, and (d) red, and (e) an unpainted control sample.

To evaluate this concept in an example experiment, paint was applied to Berea Sandstone in colors blue, purple, black, and red (See FIG. 6). Painted samples and an unpainted control sample were exposed to laser light with a wavelength of 1064 nm generated by a 2 kilowatt ytterbium laser.

Figure 7:
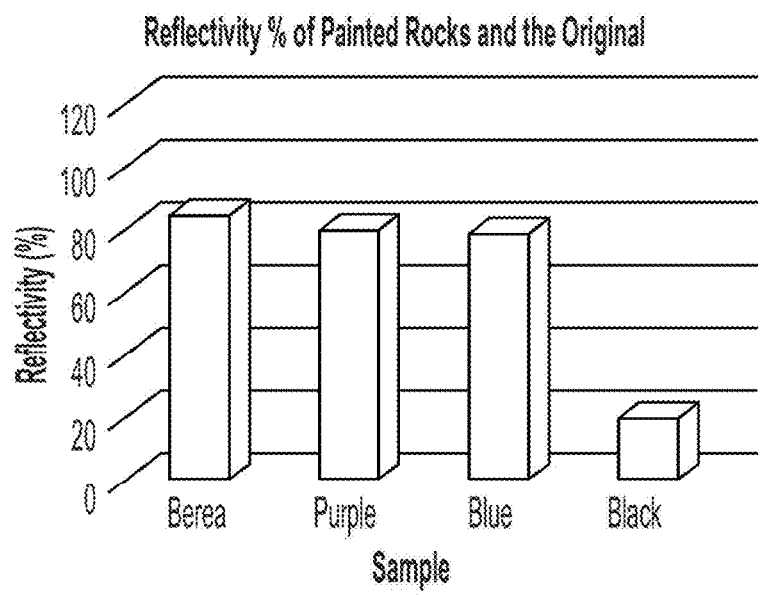
FIG. 7 is a graph illustrating reflectivity in rock sample with different colors applied to the samples.

A Lambda 950 ultraviolet-visible-infrared (UV-VIS-IR) wideband spectrophotometer was used to characterize transmittance, reflectance, and absorbance of the rock samples. Spectrophotometers can work in transmission or reflection mode. Light of different frequency was passed through the sample and a photodetector measured the amount of light transmitted or reflected. Results shown in FIG. 7 indicated that the reflectivity exhibited by a sample painted black was approximately 15% compared to a reflectivity of 85% exhibited by a natural (unpainted) sample. This result may indicate that approximately 85% of laser energy may be absorbed by Berea Sandstone that is painted black. The absorbed energy may cause may cause physical or chemical changes in a rock formation, for example, melting or sublimation. Altering color (for example, darkening) of a target rock material may reduce the amount of laser energy needed to cause physical or chemical changes in a rock formation.

Figure 8:
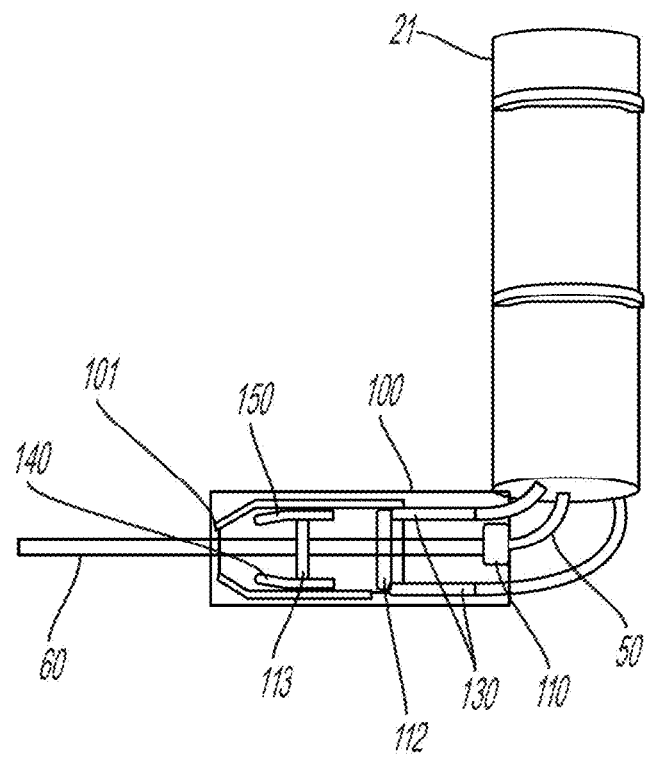
FIG. 8 shows a cross-sectional schematic view of an example color applicator head.

An example system including an example color applicator head 100 for altering color of a wellbore surface is shown in FIG. 8. An example applicator head may be optically connected to a fiber optic cable 20 enclosed in an insulation cable or housing 21. In some implementations, insulation cable or housing 21 may include one or more insulating layers, for example, configured to or capable of withstanding environmental conditions downhole. Fiber optic cable 20 may be used to conduct the raw laser beam output by a laser beam generator 10 (for example, raw laser beam 50) to one or more optical elements connected to or enclosed in applicator head 100. An example optical element 110 may be configured to receive a raw laser beam 50 from the fiber optic cable 20 and to manipulate the raw laser beam 50 to produce a laser beam output, such as laser beam 60. The example optical element 110 may be part of a focusing system and may be used to alter one or more beam parameters, for example, beam shape. In some implementations, optical element 110 may be configured to or capable of altering beam shape, for example, transforming a parallel beam into a conical beam. In some implementations, optical element 110 may be or may include a collimator, crystal, a lens, a mirror, a prism, a cube, a cylinder, or a cone, or a combination of one or more of a collimator, crystal, a lens, a mirror, a prism, a cube, a cylinder, and a cone. In some implementations, a color applicator head 100 may include a cover lenses 112 and 113 between optical element 110 and laser muzzle 101 to protect optical element 110 from dust, fluid, or debris.

Figure 9:
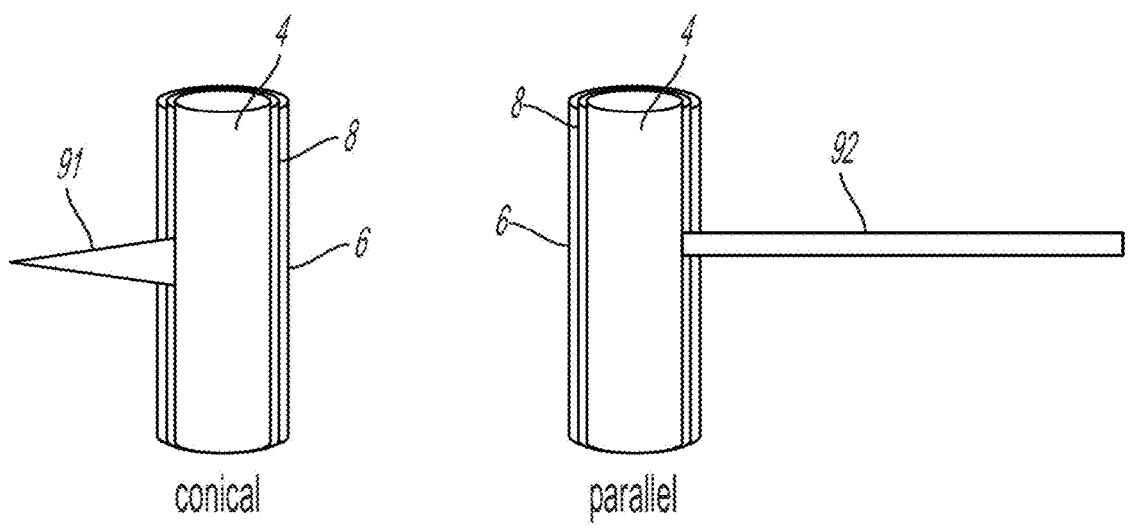
FIG. 9 shows cross-sectional schematic views of example wellbores with laser drilled holes.

In some implementations, color applicator head 100 may be adapted to produce laser beams or openings or holes in the wellbore of different shapes and sizes. For example, as shown in FIG. 9, conical holes 91 or parallel (cylindrical) holes 92 may be obtained. In some implementations, conical beams may be used to create short holes for rock perforation. These holes may be created to establish communications between the wellbore and the rock formation. These short holes may be long enough to penetrate casing, cement, and formation, such that formation of these holes may be followed by hydraulic fracturing. In some implementations, parallel beams may be used to long tunnels penetrating deeper (for example, 30 cm to 1.6 m, or about 12 inches to 64 inches)) into the formation to establish a network with the formation for production.

A color applicator head 100 may include one or more nozzles, such as internal purging nozzles 130. In some implementations, internal purging nozzles 130 may be configured to reduce or to eliminate debris, dust, or vapor in the path of a laser beam by discharging a purging medium on or near cover lens 112 or cover lens 113. Debris, dust, or vapor in the path of laser the laser beam may disrupt, bend, or scatter the laser beam. Debris, dust, or vapor may enter the laser tool 30, potentially causing damage to the tool. Internal purging nozzles 130 may be connected to a fluid conduit 171, which may be connected to a fluid reservoir 172 and a pump 173. Purging fluid, for example, a gas, for example, nitrogen, may be pumped from the fluid reservoir 172 to one or more internal purging nozzles 130. In some implementations, purging fluid may exit one or more internal purging nozzles 130 such that a purging fluid film or volume is formed on a cover lens 112 or cover lens 113, for example, between cover lens 112 or cover lens 113 and laser muzzle 101. In some implementations, a purging fluid may be used to cool one or more components of laser head 30.

A color applicator head 100 may include one or more nozzles, such as external purging nozzles 140. External purging nozzles 140 may be configured to reduce or to eliminate debris, dust, or vapor in the path of a laser beam at or near laser muzzle 101 by discharging a purging medium on or near laser muzzle 101. External purging nozzles 140 may be connected to a fluid conduit 171, which may be connected to a fluid reservoir 172 and a pump 173. Purging fluid, for example, a gas, for example, nitrogen, may be pumped from the fluid reservoir 172 to one or more external purging nozzles 140. In some implementations, purging fluid may exit one or more external purging nozzles 140 such that a purging fluid film or volume is formed in, on, or near a laser muzzle 101. In some implementations, a purging fluid film or volume is formed between a laser muzzle 101 and an interior wall of a wellbore.

The choice of purging fluid to use, such as liquid or gas, may be based on the type of rock in the formation and the pressure of a reservoir associated with the formation. In some implementations, the purging fluid may be, or include, a non-reactive, non-damaging gas such as nitrogen. A gas purging medium may be appropriate when fluid pressure in the wellbore is small, for example, less than 50000 kilopascals, less than 25000 kilopascals, less than 10000 kilopascals, less than 5000 kilopascals, less than 2500 kilopascals, less than 1000 kilopascals, or less than 500 kilopascals. In some implementations, internal purging nozzles 130 or external purging nozzles 140 may lie flush inside of color applicator head 100 so as not to obstruct the path of laser beam 160. In some implementations, purging may be cyclical. For example, purging may occur while the laser beam is on. In some implementations, purging may occur while the laser beam is off.

Dust or vapor, or other debris, may be created during laser operation, for example, by sublimation rock. In some implementations, a color applicator head 100 may include a vacuum nozzle (not shown) that may be configured to aspirate or to vacuum such dust or vapor from an area surrounding laser muzzle 101. Purging internal purging nozzles 130 or external purging nozzles 140, and vacuum nozzles may be configured to operate together to reduce or to eliminate dust and vapor in the path of a laser beam. The aspirated dust or vapor may be sent to the surface and analyzed. The dust or vapor may be analyzed to determine a type of the rock and fluids contained in the rock. The vacuum nozzles may be positioned flush with the laser muzzle. The vacuum nozzles may include one, two, three, four, or more nozzles depending, for example, on the quantity of dust and vapor. The size of vacuum nozzles may depend, for example, on the volume of dust or vapor to be removed and the physical requirements of the system to transport the dust to the surface. Vacuum nozzles may operate cyclically or continuously.

A color applicator head 100 may include one or more nozzles, such as color applicator nozzles 150. Color applicator nozzles 150 may be connected to a conduit, for example, a fluid conduit 171, which may be connected to a reservoir, for example, a fluid reservoir 172, and a pump 173 for storing and delivering one or more coloring agents to the one or more color applicator nozzles. Color applicator nozzles 150 may be capable of configured to discharge one or more coloring agents on or near laser muzzle 101. A coloring agent may be of any suitable color as described in this specification. In some implementations, a coloring agent may be or include a powder. In some implementations, a coloring agent may be or include a liquid, a gas, or an aerosol. In some implementations, a coloring agent may be or may include a fluid that is insoluble in oil and water. In some implementations, a coloring agent may be or include a paint, for example, an acrylic paint. A color applicator nozzle may be configured to discharge a coloring agent at a pressure that is sufficient to displace wellbore fluids surrounding the laser muzzle 101. A color applicator nozzle may be positioned on or near laser muzzle 101 and may be configured to discharge a coloring agent at a pressure that is sufficient to displace wellbore fluids surrounding the color applicator nozzle 150 and contact a surface in a wellbore that is located about 1 centimeter (cm), 2 cm, 3 cm, 4 cm, 5 cm, 10 cm, or 20 cm from laser muzzle 101. A color applicator nozzle may be configured to discharge a coloring agent such that a surface in a wellbore that covered by a coloring agent is about 1 centimeter squared ($cm^2$), 2 $cm^2$, 3 $cm^2$, 4 $cm^2$, 5 $cm^2$, 10 $cm^2$, or 20 $cm^2$.

Figure 10A:
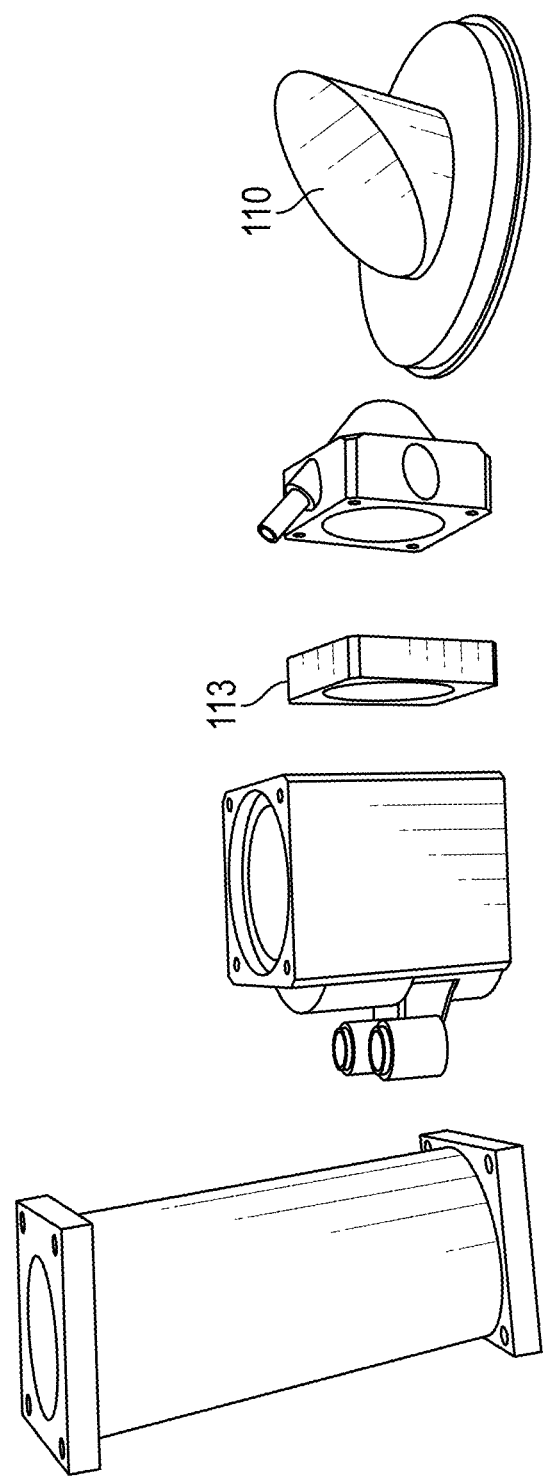
FIGS. 10A and 10B are photograph of an example prototype color applicator head.
Figure 10B:
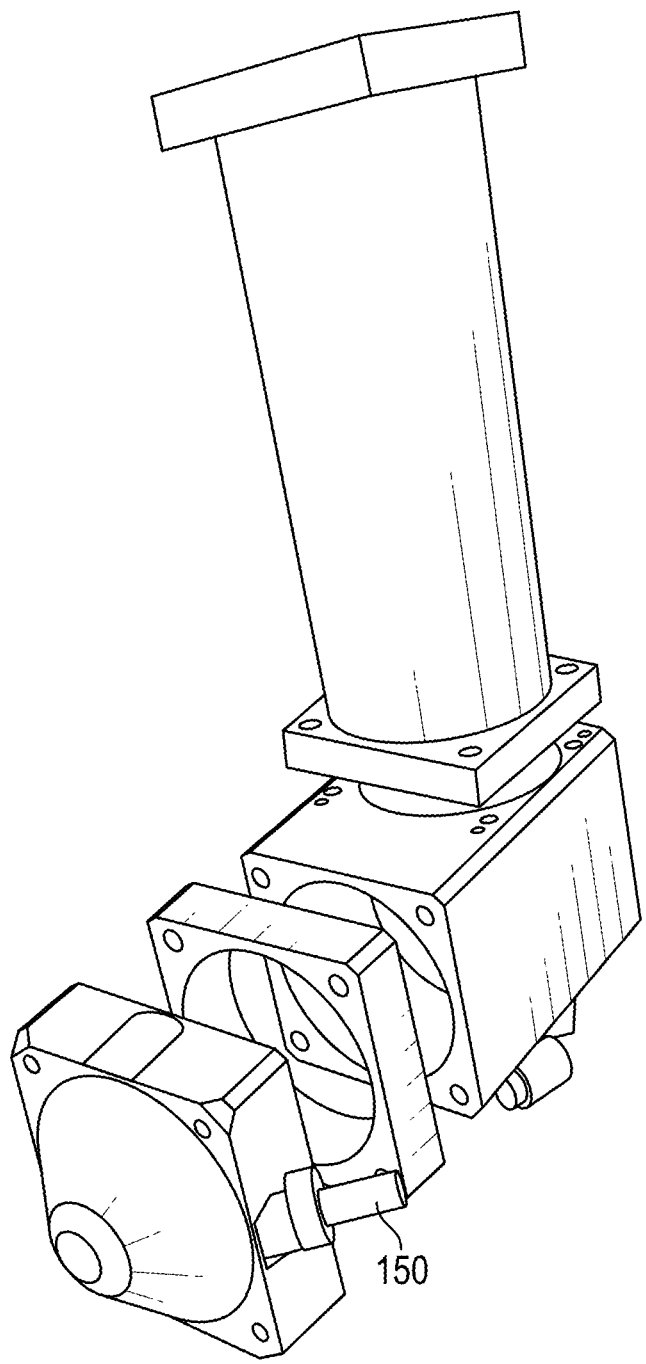
Figure 11A:
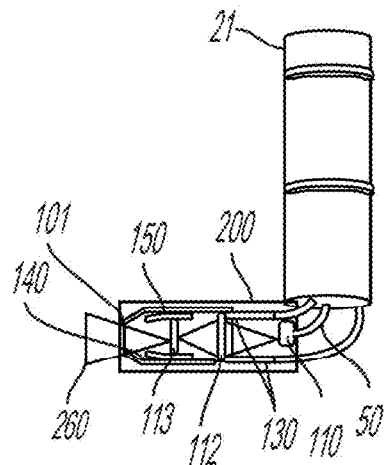
FIGS. 11A and 11B are a cross-sectional schematic views an example extendable color applicator head.
Figure 11B:
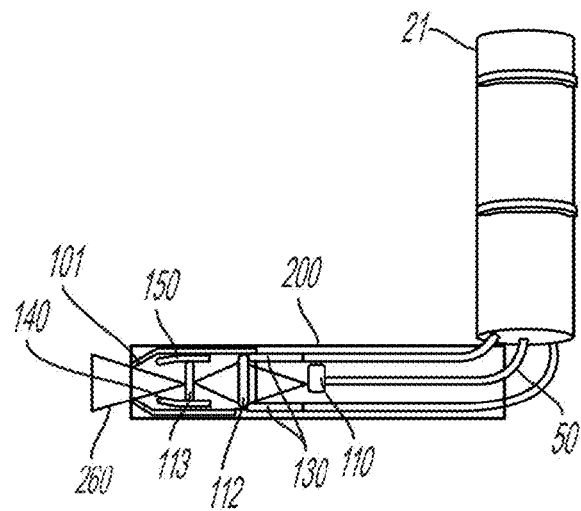

An example prototype color applicator head 100 is shown in FIGS. 10A and 10B. An example system including an example extendable color applicator head 200 for altering color of a wellbore surface is shown in FIG. 11A and FIG. 11B. In some implementations, extendable color applicator head 200 may include optical element 110 and cover lenses 112 and 113. In some implementations, one or more lenses, for example, cover lens 113, may be used to focus or defocus a laser beam, for example, divergent laser beam 260. Defocusing a laser beam, for example, laser beam 260 may allow the beam to create a larger hole size, for example, a hole with a diameter that is greater than the diameter of extendable color applicator head 200. This procedure may allow the insertion of the extendable color applicator head 200 into the hole. In some implementations, a lens, for example, cover lens 112 may be used to focus or defocus a laser beam, for example, raw laser beam 50. In some implementations, a lens, for example, cover lens 113 may be mounted on a movable stage such cover lens 113 may rotate or deflect (for example, at an angle), or both, a laser beam, for example, to create a larger hole size, for example, a hole with a diameter that is greater than the diameter of extendable color applicator head 200. In some implementations, a moveable stage may include an electric motor connected to a control unit. In some implementations, a divergent beam may require more laser energy at least in part due to the larger area covered compared to a parallel laser beam. In some implementations, a raw laser beam of at least 10 kW may be used for output of a divergent laser beam. Power may be increased during operation to maintain the intensity at the surface being treated.

In some implementations, an extendable color applicator head 200 is configured to extend or otherwise move one or more components of extendable color applicator in a direction substantially perpendicular to a wall of a wellbore, or in a direction that is not parallel with a wall of a wellbore. An extendable color applicator head 200 may include or may be connected to a telescopic actuation mechanism that may linearly extend the color applicator head 200 in a direction parallel to an axis of a laser beam, for example, laser beam 260. In some implementations, an extendable color applicator head 200 is configured to provide for short length penetration (for example, less than 5 cm, 4 cm, 3 cm, 2 cm, or 1 cm) into a wall of a wellbore. Color applicator nozzles 150 may be used to cover a wellbore surface with a coloring agent. A laser beam, for example laser beam 260, may be applied to the colored surface, causing rock to melt or sublimate. As a hole is formed or extended by the laser beam, a target surface may thus move away from the tool. This movement may cause the surface to move out of range of color applicator nozzles 150, and the original color of the rock may reappear at the surface (or interface with the laser beam). The energy reflected may thus increase. In some implementations, an extendable color applicator head 200 may extend one or more components (or the entire extendable color applicator head 200) of extendable color applicator head 200 into the hole created, for example, to maintain constant distance between muzzle 101 and the surface to be treated. In some implementations, the extensions may allow the head to be inserted into a hole with the color applicator nozzles 150 while a coloring agent is discharge at the surface of the materials improving the coupling.

In some example implementations, a procedure may include alternating beam discharge and color application.

For example, a laser beam (for example, beam 260) may be on for 4 seconds, and then off for 2 seconds. While the beam is off, the color applicator nozzles 150 are on and discharge one or more coloring agents to alter the material surface colors. During or between these cycles, extendable color applicator head 200 may extend into the hole formed by the operation of the tool. In some implementations, extendable color applicator head 200 may extend during laser operation. In some implementations, extendable color applicator head 200 may extend after laser operation.

An example laser tool may operate downhole to create openings in a casing in the wellbore to repair cementing defects. In an example, a wellbore includes a casing that is cemented in place to reinforce the wellbore against a rock formation. During a cementing procedure, cement slurry is injected between the casing and the rock formation. Defects may occur in the cement layer, which may require remedial cementing. Remedial cementing may involve squeezing additional cement slurry into the space between the casing and the rock formation. The laser tool may be used to generate a laser beam that has an energy density that is great enough to create one or more openings in the casing on or near a cementing defect. The one or more openings may provide access for a cementing tool to squeeze cement slurry through the opening into the defect.

An example laser tool may operate downhole to create openings in a casing in the wellbore to provide access for a wellbore drilling tool. In an example, an existing single wellbore is converted to a multilateral well. A multilateral well is a single well having one or more wellbore branches extending from a main borehole. In order to drill a lateral well into a rock formation from an existing wellbore, an opening is created in the casing of the existing wellbore. The laser tool may be used to create an opening in the casing at a desired location for a wellbore branching point. The opening may provide access for drilling equipment to drill the lateral wellbore.

An example laser tool may operate downhole to create openings in a casing in the wellbore to provide sand control. During operation of a well, sand or other particles may enter the wellbore causing a reduction in production rates or damage to downhole equipment. The laser tool may be used to create a sand screen in the casing. For example, the laser tool may be used to create a number of openings in the casing that are small enough to prevent or to reduce entry of sand or other particles into the wellbore while maintaining flow of production fluid into the wellbore.

An example laser tool may operate downhole to re-open a blocked fluid flow path. Production fluid flows from tunnels or cracks in the rock formation into the wellbore through holes in the wellbore casing and cement layer. These flow paths may become clogged with debris contained in the production fluid. The laser tool may be used to generate a laser beam that has an energy density that is great enough to liquefy or to sublimate the debris in the flow path, allowing for removal of the debris together with production fluid. In an example, the laser tool may be used to liquefy or to sublimate sand or other particles that may have become packed tightly around the sand screen in the casing, thus re-opening the fluid flow path into the wellbore.

An example laser tool may operate downhole to weld a wellbore casing or other component of a wellbore. During operation, one or more metal components of a wellbore may become rusted, scaled, corroded, eroded, or otherwise defective. Such defects may be repaired using welding techniques. The laser tool may be used to generate a laser beam that has an energy density that is great enough to liquefy metal or other material to create a weld. In some implementations, material of a wellbore component, such as a casing material, may be melted using the laser tool. Resulting molten material may flow over or into a defect, for example due to gravity, thus covering or repairing the defect upon cooling and hardening. In some implementations, the laser tool may be used in combination with a tool that provides filler material to the defect. The laser tool may be used to melt an amount of filler material positioned on or near a defect. The molten filler material may flow over or into a defect, thus covering or repairing the defect upon cooling and hardening.

An example laser tool may operate downhole to heat solid or semi-solid deposits in a wellbore. In producing wells, solid or semi-solid substances may deposit on wellbore walls or on downhole equipment causing reduced flow or blockages in the wellbore or production equipment. Deposits may be or include condensates (solidified hydrocarbons), asphaltene (a solid or semi-solid substance comprised primarily of carbon, hydrogen, nitrogen, oxygen, and sulfur), tar, hydrates (hydrocarbon molecules trapped in ice), waxes, scale (precipitate caused by chemical reactions, for example calcium carbonate scale), or sand. The laser tool may be used to generate a laser beam that has an energy density that is great enough to melt or to reduce the viscosity of deposits. The liquefied deposits can be removed together with production fluid or other fluid present in the wellbore.

At least part of the laser tool system and its various modifications may be controlled by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, an field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media. Machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semi-conductor storage area devices, for example, erasable programmable read-only memory (EPROM), electrically erasable programmable read-only memory (EEPROM), and flash storage area devices. Non-transitory machine-readable storage media include, for example, magnetic disks, for example, internal hard disks or removable disks, magneto-optical disks, and CD-ROM and DVD-ROM disks.

Each computing device may include a hard drive for storing data and computer programs, a processing device (for example, a microprocessor), and memory (for example, RAM) for executing computer programs.

Components of different implementations described in this specification may be combined to form other implementations not specifically set forth in this specification. Components may be left out of the systems described in this specification without adversely affecting their operation.

What is claimed:

1. A system configured to operate within a wellbore of a hydrocarbon-bearing rock formation, the system comprising:
    one or more optical transmission media, the one or more optical transmission media being part of an optical path originating at a laser generator configured to generate a laser beam comprising an axis, the one or more optical transmission media being configured for passing the laser beam;
    a reservoir that stores one or more coloring agents;
    a pump coupled to the reservoir; and
    a color applicator head coupled to the one or more optical transmission media and the reservoir, the color applicator head comprising:
        an optical element that is part of the optical path, the optical element for receiving the laser beam from the one or more optical transmission media and for output to the hydrocarbon-bearing rock formation, and
        a color applicator nozzle configured to discharge one or more coloring agents to a surface in the wellbore in a path of the laser beam,
    wherein the color applicator nozzle is coupled to the reservoir using a fluid conduit,
    wherein the pump is configured to pump the one or more coloring agents from the reservoir to the color applicator nozzle.

2. The system of claim 1, where the one or more coloring agents comprise liquid, a fluid that is insoluble in oil and water, a paint, or combinations thereof.

3. The system of claim 1, where the one or more coloring agents comprise a black liquid agent, and where the color applicator head is connected to a fiber optic cable enclosed within an insulation cable comprising one or more insulating layers.

4. The system of claim 1, where the color applicator head is extendable along the axis of the laser beam, and where the color applicator head is configured to enter a hole in the hydrocarbon-bearing rock formation formed by the laser beam.

5. The system of claim 1, wherein the color applicator head comprises a vacuum nozzle for aspirating an area surrounding a laser muzzle in the color applicator head, and where the color applicator head comprises a lens configured to defocus the laser beam.

6. The system of claim 1, where the color applicator head comprises a lens mounted on a movable stage such that the lens deflects or rotates the laser beam in a range from 0° to 360°.

7. The system of claim 1, where the color applicator head comprises one or more purging nozzles for removing dust or vapor from a path of the laser beam.

8. A method performed within a wellbore of a hydrocarbon-bearing rock formation, the method comprising:
    storing one or more coloring agent in a reservoir coupled to a pump;
    pumping, using the pump, the one or more coloring agents through a fluid conduit from the reservoir to a color application nozzle in a color applicator head;
    passing, through one or more optical transmission media, a laser beam comprising an axis and generated by a laser generator at an origin of an optical path, the optical path comprising the one or more optical transmission media; and
    applying the one or more coloring agents to a surface in the wellbore in a path of the laser beam using the color applicator head discharging the one or more coloring agents into the wellbore,
    wherein the color applicator nozzle discharges the one or more coloring agents.

9. The method of claim 8, where the one or more coloring agents comprise a liquid, a fluid that is insoluble in oil and water, a paint, or combinations thereof.

10. The method of claim 8, further comprising:
    defocusing the laser beam to allow the laser beam to create a hole within the surface in the wellbore with a diameter that is larger than a diameter of the color applicator head; and
    inserting the color applicator head into the hole,
    where the one or more coloring agents comprise a black liquid agent.

11. The method of claim 8, comprising alternating discharging the laser beam and applying the one or more coloring agents to the surface.

12. The method of claim 8, where the color applicator head is extendable along the axis of the laser beam, the method comprising extending the color applicator head along an axis of the laser beam.

13. The method of claim 12, the method comprising alternating discharging the laser beam and applying the one or more coloring agents to the surface, extending the color applicator head along an axis of the laser beam after each discharging of the laser beam.

14. The method of claim 12, the method comprising alternating discharging the laser beam and applying the one or more coloring agents to the surface, extending the color applicator head along an axis of the laser beam during each discharging of the laser beam.

15. The method of claim 8, comprising moving a lens of the color applicator head to deflect or rotate the laser beam in a range from 0° to 360°.

16. The method of claim 8, comprising purging dust or vapor from the path of the laser beam.

* * * * *